United States Patent
Sarraillon et al.

(10) Patent No.: US 8,307,563 B2
(45) Date of Patent: Nov. 13, 2012

(54) DEVICE AND METHOD FOR ALIGNING ONE OR MORE WIRES IN A PLANE

(75) Inventors: Serge Sarraillon, Varennes (CA); Guillaume Boivin, Saint-Léonard (CA)

(73) Assignee: Hydro-Quebec, Quebec (CA)

( * ) Notice: Subject to any disclaimer, the term of this patent is extended or adjusted under 35 U.S.C. 154(b) by 0 days.

(21) Appl. No.: 13/138,381

(22) PCT Filed: Feb. 4, 2010

(86) PCT No.: PCT/CA2010/000128
§ 371 (c)(1),
(2), (4) Date: Aug. 8, 2011

(87) PCT Pub. No.: WO2010/088758
PCT Pub. Date: Aug. 12, 2010

(65) Prior Publication Data
US 2011/0289789 A1    Dec. 1, 2011

(30) Foreign Application Priority Data
Feb. 9, 2009 (CA) ..................................... 2652686

(51) Int. Cl.
*G01B 5/25* (2006.01)
(52) U.S. Cl. ................. 33/301; 33/397; 33/645
(58) Field of Classification Search ............ 33/301, 33/365, 369, 391, 392, 397, 613, 645
See application file for complete search history.

(56) References Cited

U.S. PATENT DOCUMENTS

| | | | |
|---|---|---|---|
| 3,683,510 A * | 8/1972 | Gros | 33/392 |
| 3,938,258 A | 2/1976 | Zook | |
| 4,102,055 A | 7/1978 | Volk, Jr. | |
| 4,121,347 A | 10/1978 | Thele | |
| 4,241,510 A * | 12/1980 | Radecki | 33/613 |
| 4,470,199 A | 9/1984 | Krezak et al. | |
| 4,503,622 A | 3/1985 | Swartz et al. | |
| 4,549,277 A | 10/1985 | Brunson et al. | |
| 4,551,921 A | 11/1985 | Puyo et al. | |
| 4,858,137 A | 8/1989 | Bradley | |
| 5,191,713 A | 3/1993 | Alger et al. | |
| 5,440,817 A | 8/1995 | Watson et al. | |
| 5,937,371 A | 8/1999 | Gruetzmacher | |
| 6,041,509 A | 3/2000 | Shelyago | |

(Continued)

FOREIGN PATENT DOCUMENTS

EP    0841465 A1    5/1998
WO    WO 01/77618 A1    10/2001

*Primary Examiner* — G. Bradley Bennett
(74) *Attorney, Agent, or Firm* — Muirhead and Saturnelli, LLC

(57) ABSTRACT

Device and method for precisely aligning at least one wire in a plane projecting from a surface on which an end of the wire is anchored. The wire in taut position is held by a fastener rigidly connected to an inclinometer capable of measuring an inclination of the wire. The inclinometer is connected to a mobile member of a structure by a joint having elements articulated with respect to each other in order to allow a relative angular displacement of the elements. The mobile member is movable with respect to the surface in order to allow a positioning of the wire in the plane according to the inclination of the wire measured by the inclinometer free to turn freely according to an axis of the wire. The device is adaptable for aligning two wires forming a precise reference plane.

17 Claims, 4 Drawing Sheets

U.S. PATENT DOCUMENTS

| | | |
|---|---|---|
| 6,449,857 B1 | 9/2002 | Anikolenko |
| 6,665,062 B2 | 12/2003 | Ferdinand et al. |
| 7,178,377 B2 * | 2/2007 | Suzuki ............................ 33/391 |
| 2003/0084582 A1 | 5/2003 | Singer et al. |
| 2003/0233759 A1 * | 12/2003 | Taylor ............................. 33/304 |
| 2012/0192442 A1 * | 8/2012 | Song et al. ...................... 33/301 |

* cited by examiner

DEVICE AND METHOD FOR ALIGNING ONE OR MORE WIRES IN A PLANE

FIELD OF THE INVENTION

The invention relates to a device and a method for aligning one or more wires in a plane, for example vertical or horizontal, projecting from a surface to which an end of each wire is anchored.

BACKGROUND

There are various instruments and tools used for verifying the horizontality or the verticality of a surface like, for example, levels and pendulums. Levels allow in particular to draw and build levelled surfaces, generally horizontal or vertical, and sometimes at a predetermined angle like at 45°. Levels may be used to draw a marking or reference line going from one point to another while being well parallel with the sea level (horizontal) or at 90° from it (vertical). Levels are used for the construction of walls and floors so that they are properly oriented. A plumb bob hanging from a wire is normally used as a pendulum to verify the verticality.

The principle of a pendulum is that of the plumb-line. The line is fixed at one of its ends and passes at the other end before a reading table fixed to a work (dam, building, etc.). Depending on whether the attachment point of the wire is located upward or downward, it is called a direct pendulum or an inverted pendulum. For the direct pendulum, the tensioning of the wire is ensured by a weight whereas it is ensured by a floater for an inverted pendulum. The reading table, with aiming points, is used for the precision. The pendulum exhibits qualities similar to those of auscultation apparatuses where frequent readings can be performed.

To sum up, the use of a level or a pendulum is a simple and efficient solution to level a non-immerged surface. However, for immerged or partially immerged works, an inverted pendulum needs to be considered. Unfortunately, the inverted pendulum quickly looses its precision if the water is not completely stagnant. To make it sturdier, the tension in the wire must be increased, which involves increasing the size of the floater, so that it becomes cumbersome and heavy, to the extent that it becomes practically impossible to have several wires brought closer at short distance. However, such a need exists, for example, to achieve a levelling used for the inspection of a partially or fully immerged structure like a dam.

SUMMARY

An object of the present invention is to provide a device and a method for aligning one or more wires in a plane likely to serve as reference and that projects from a surface on which an end of each wire is anchored.

Another object of the present invention is to provide such a device and such a method for aligning one or more wires in a vertical or horizontal plane with a high degree of precision.

Another object of the invention is to provide such a device and such a method that allow obtaining a precise reference plane formed by two parallel wires.

Another object of the present invention is to provide such a device and such a method that allow achieving a levelling of a partially or fully immerged structure.

Another object of the present invention is to provide such a device and such a method that have a sturdiness allowing an underwater use in possibly harsh conditions, and that have a reduced sensitivity to perturbations as water motions, vibrations, shocks, and a possible water turbidity.

According to an aspect of the invention, there is provided a device for aligning at least one wire in a plane projecting from a surface on which an end of the wire is anchored, comprising:
    a fastener disposed at a distance from the surface to hold the wire in taut position;
    an inclinometer rigidly connected to the fastener, the inclinometer being capable of measuring an inclination of the wire held by the fastener;
    a joint having first and second elements articulated with respect to each other in order to allow a relative angular displacement of the elements, the first articulated element being rigidly connected to the inclinometer; and
    a structure having a mobile member to which the second articulated element is secured, the mobile member being movable with respect to the surface in order to allow a positioning of the wire in the plane according to the inclination of the wire measured by the inclinometer.

According to another aspect of the invention, there is provided a method for aligning at least one wire in a plane projecting from a surface on which an end of the wire is anchored, comprising the steps of:
    fastening the wire to a fastener disposed at a distance from the surface for holding the wire in taut position;
    measuring an inclination of the wire held by the fastener with an inclinometer rigidly connected to the fastener;
    providing a joint having first and second elements articulated with respect to each other in order to allow a relative angular displacement of the elements, the first articulated element being rigidly connected to the inclinometer;
    providing a structure having a mobile member to which the second articulated element is secured; and
    moving the mobile member with respect to the surface in order to position the wire in the plane according to the inclination of the wire measured by the inclinometer.

BRIEF DESCRIPTION OF THE DRAWINGS

A detailed description of preferred embodiments will be given herein below with reference to the following drawings.

DETAILED DESCRIPTION OF THE PREFERRED EMBODIMENTS

Figure 1:
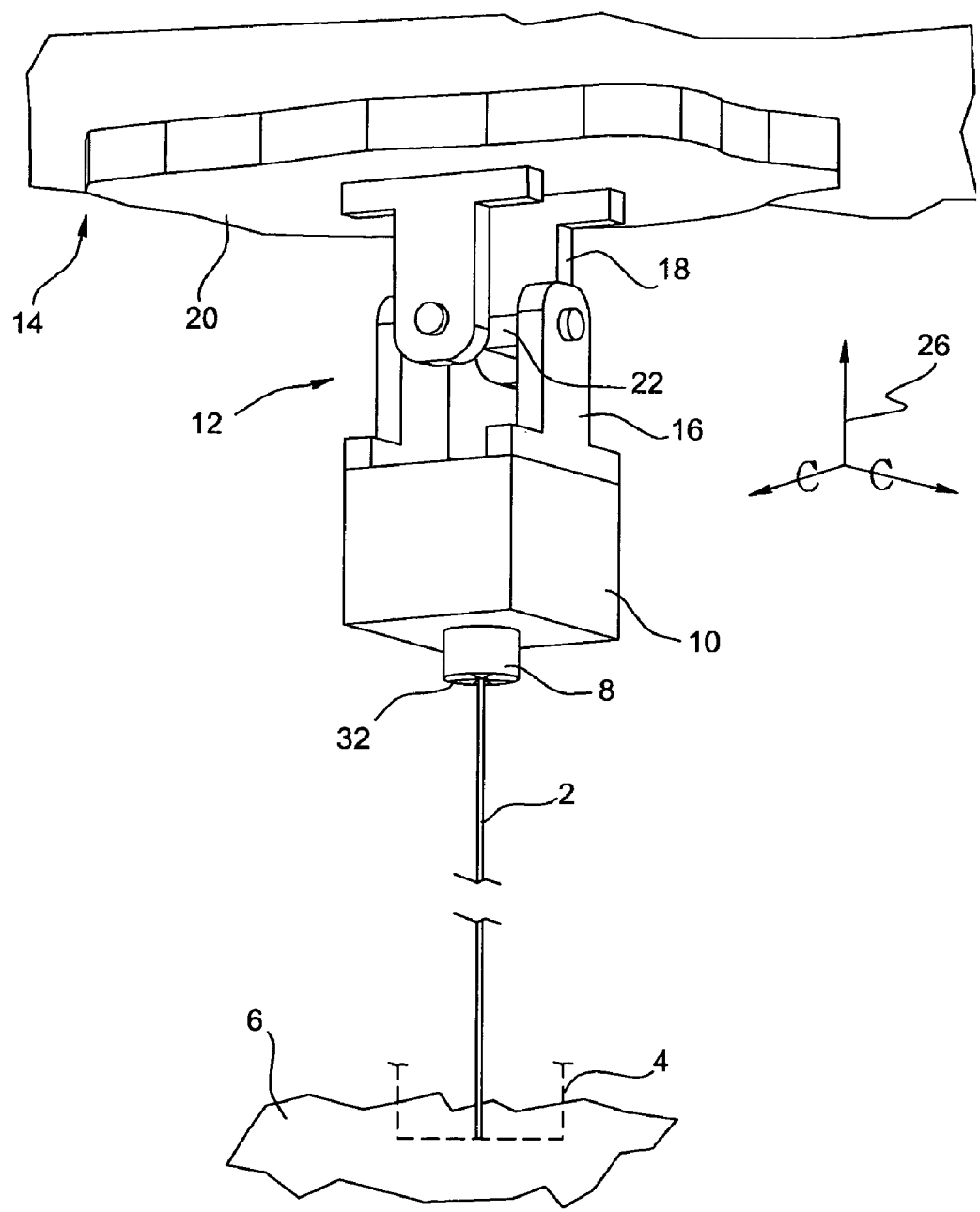
FIG. 1 is a perspective schematic view of a device for aligning a wire in a vertical plane.

Referring to FIG. 1, there is shown a device for aligning a wire 2 in a plane 4 (partially shown in stippled line) projecting from a surface 6 on which an end of the wire 2 is anchored. The device comprises a fastener 8 rigidly connected to an inclinometer 10 located at a distance from the surface 6, fastening the wire 2 to the inclinometer 10. The device comprises a joint 12 intended to allow the inclinometer 10 to freely turn according to the angle of the wire 2, and a support structure 14. The inclinometer 10 is capable of measuring the orientation of the wire 2 held by the fastener 8. The joint 12 is a Cardan joint having two elements 16, 18 articulated with respect to each other following axes substantially perpendicular to an axis in which the wire 2 is taut. The articulated element 16 is rigidly connected to the inclinometer 10, whereas the articulated element 18 is secured to a mobile member 20 of the structure 14. The structure 14 is such that the mobile member 20 is movable with respect to the surface 6 in order to allow a positioning of the wire 2 in the plane 4 according to the inclination of the wire 2 measured by the inclinometer 10.

Preferably, the fastener 8, the inclinometer 10 and the joint 12 extend in a same axis, so as to precisely know the positioning of the axis of the wire 2. They may be disposed otherwise if desired, depending on their shapes and constructions. However, it should be taken into account that the static balancing of the inclinometer 10 may bias the precision of the positioning of the wire 2 in the plane 4.

The model of inclinometer Schaevitz® T435 manufactured by the company Sherborne Sensors Limited may advantageously be used as inclinometer 10. Such a model has a reduced casing (40.6 mm of height by 37 mm of diameter, which allows using it in constricted spaces), is very resistant (capable of withstanding shocks of 1500 g), has a high precision (resolution of 0.2 seconds of arc), and can be piled up to simultaneously measure the inclination in X and Y. Other types and models of inclinometers may be used if desired, as for example the inclinometers of the company VTI technologies based on the 3D-MEMS ("Three-dimensional Micro-Electro-Mechanical-Systems") technology. Such inclinometers suit the intended conditions of application of the device as they are highly resistant to shocks (20000 g), miniature, cheap and temperature compensated straight from the chip. These features are highly interesting since the inclinometer 10 may be subjected to strong variations of temperature and it may go underwater. In the case where the inclinometer 10 used needs to be connected by wires to an external supply source and an inclination reading unit (not shown), a passage (not shown) may be made in the articulated elements. 16, 18 to run the wires to the inclinometer 10 in order to reduce the transmission of efforts on the wire 2.

Figure 3:
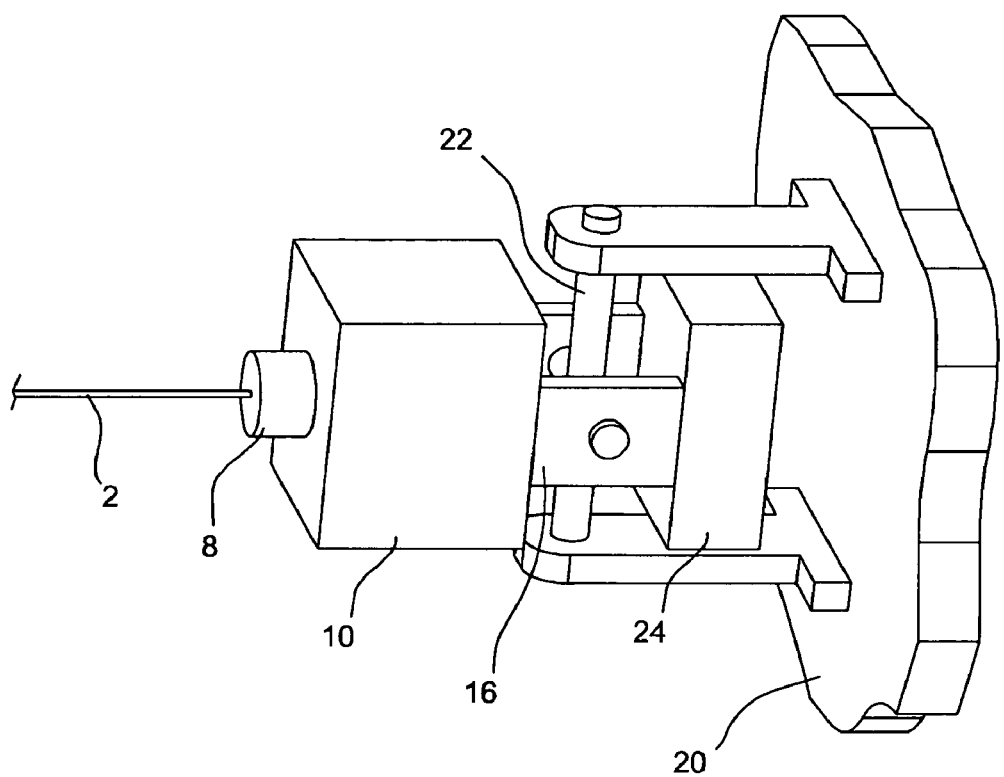
FIG. 3 is a perspective schematic view of a device for aligning a wire in a horizontal plane, with a counterweight.

The articulated elements 16, 18 may take the form of forks coupled to each other by a brace 22 or a ring or a like intermediate element, alike a Cardan joint. Such a configuration, as well as the shape and the arrangement of the fastener 8 and of the inclinometer 10, is particularly advantageous when the wire 2 needs to be positioned in a plane 4 as perfectly vertical as possible, as shown in FIG. 1, or in a plane 4 as perfectly horizontal as possible as shown in FIG. 3. The Cardan joint 12 may be replaced by a spherical joint (not shown) if desired.

The structure 14 may take the form of a table having five degrees of liberty, as depicted by the system of axes and rotation 26, for moving the mobile member 20 and allowing the vertical positioning of the wire 2 in the plane 4 with precision. The table may be moved by means of a system of rails, plates, translation members (e.g. screws, gearings, etc.) and possibly rotation members (not shown), or any other appropriate system allowing the mobile member 20 to be sufficiently moved for allowing the positioning of the wire 2 in the intended plane 4. Depending on the application, three degrees of liberty (two in translation, one in rotation) may be enough.

The fastener 8 may advantageously be made and operate in the manner of a mandrel having a notched surface 32 to ensure the tightening of the wire 2 while minimizing the possible effect of the fastener 8 on the inclination (or angle) of the wire 2. Any other type of fastener may however be used if desired, such as a fastener with pulley(s), preferably having no or little effect on the angle of the wire 2.

Figure 2:
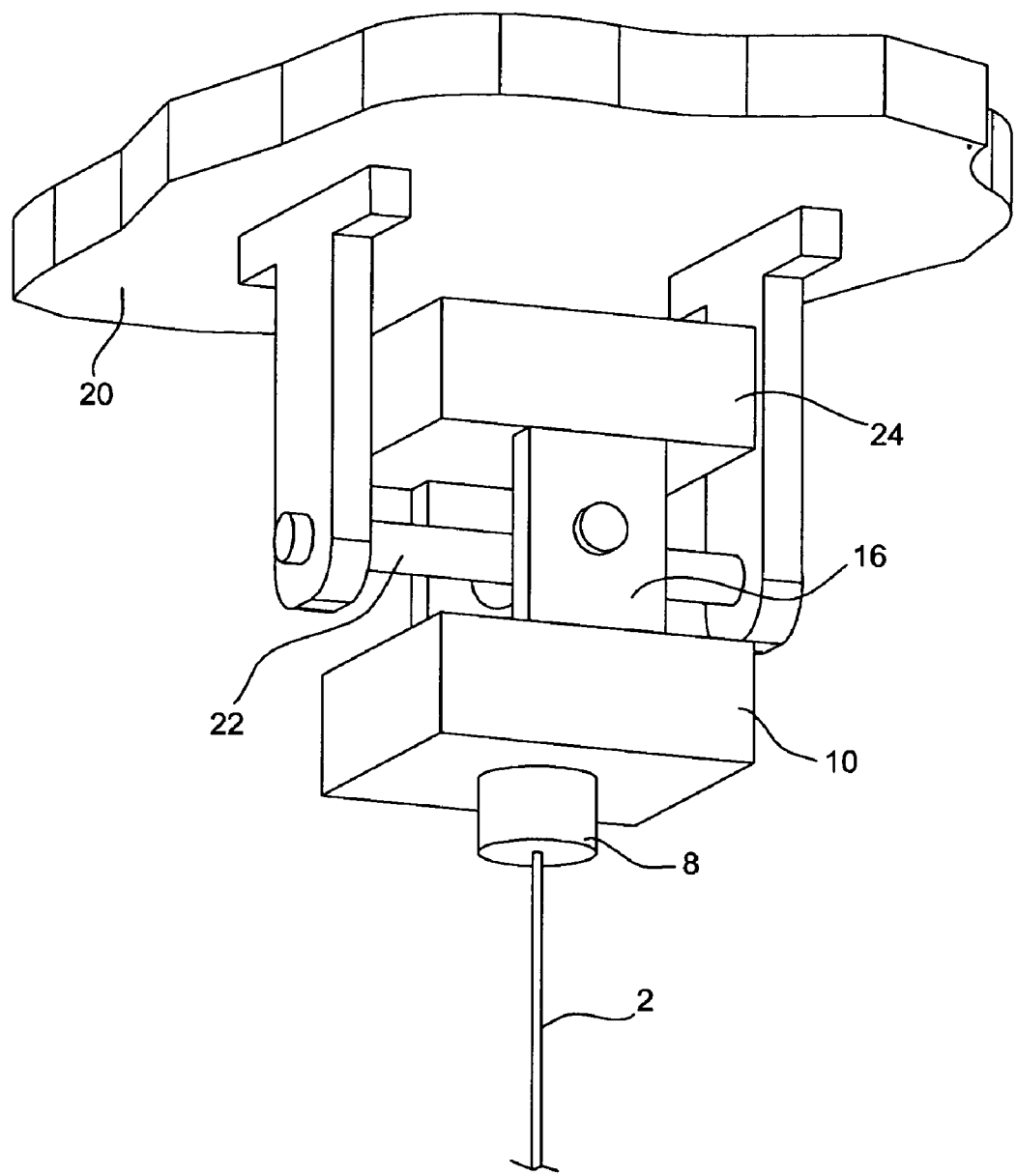
FIG. 2 is a perspective schematic view of a device for aligning a wire in a vertical plane, with a counterweight.

Referring to FIGS. 2 and 3, the device may comprise a counterweight 24 coupled to the first articulated element 16 and projecting between the mobile member 20 and the inclinometer 10, to reduce the possible effect of the weight of the inclinometer 10 on the angle of the wire 2. The counterweight 24 and the first articulated element 16 preferably have symmetrical positions with respect to the brace 22. However, their positions may be different depending on their shapes and their constructions.

Figure 4:
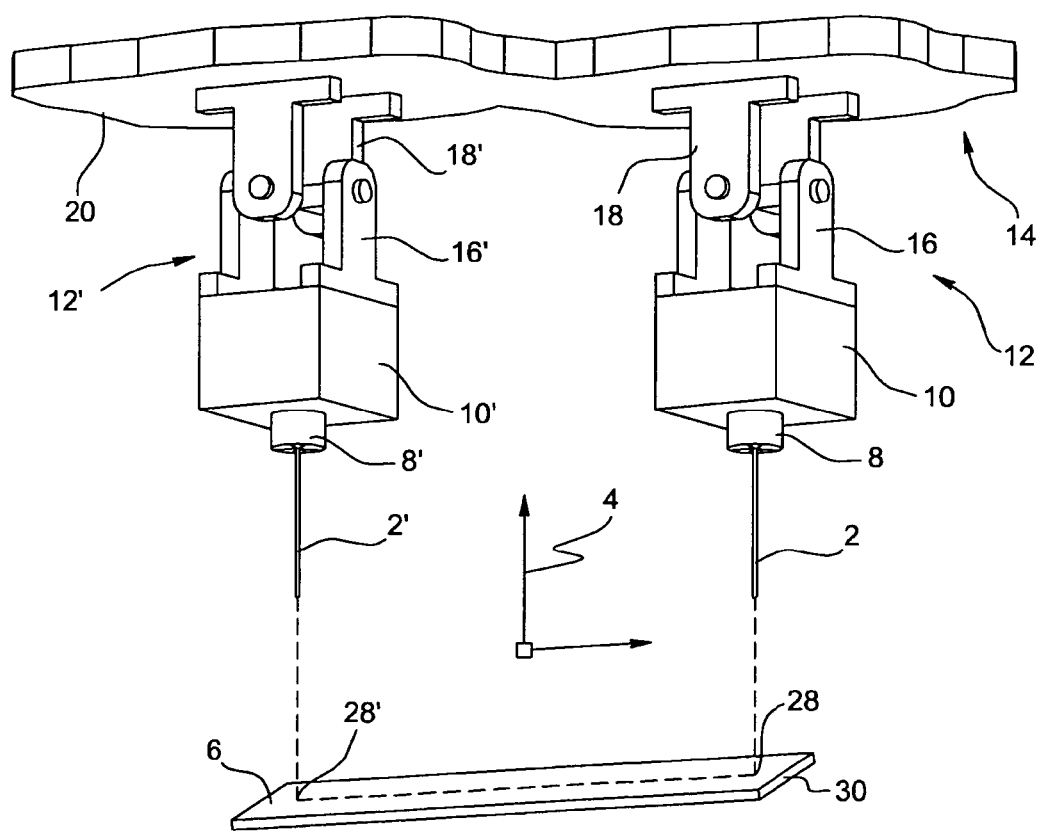
FIG. 4 is a perspective schematic view of a device for aligning two wires in parallel in a vertical plane.

Referring to FIG. 4, the device may be used to align several wires 2, 2' in a same plane 4 depicted in the FIG. 4 by axes X-Z, to form for example a reference plane. In the illustrated case, an extra wire 2' has an end anchored on the surface 6 at a distance from an anchoring point 28 of the other wire 2. The device then further comprises an extra fastener 8', and extra inclinometer 10', an extra joint 12' having first and second articulated elements 16', 18', alike those that are in connection with the other wire 2. The second articulated element 18' of the extra joint 12' is fastened to the mobile member 20 at a distance from the second articulated element 18 of the other joint 12. In this case, the structure 14 (shown in FIG. 1) comprises rotation members (not shown) in order that the mobile member 20 be pivotable at least with respect to the Z axis in which the other wire 2 is taut so as to allow a positioning of the extra wire 2' in the plane 4 according to the inclination measured by the extra inclinometer 10'.

To facilitate the creation of a reference plane defined by the wires 2, 2', the device may be provided with a plate 30 having a surface 6, the ends of the wires 2, 2' being anchored to the surface 6 of the plate 30. The distances between the anchoring points 28, 28' of the wires 2, 2' and between the second articulated elements 18, 18' may be identical (according to a desired tolerance degree if necessary) so that the wires 2, 2' extend in parallel when the wires 2, 2' are taut.

The device thus allows aligning one or several wires 2, 2' in taut position in a desired plane 4, in particular in a practically vertical or horizontal plane. In the case of a single wire 2, it is just a matter of fastening the wire 2 to the fastener 8 disposed at a distance from the surface 6, measuring the inclination of the wire 2 held by the fastener 8 with the inclinometer 10, and moving the mobile member 20 with respect to the surface 6 in order to position the wire 2 in the plane 4 according to the inclination of the wire 2 measured by the inclinometer 10.

In the case of two wires 2, 2' (or more), it is just a matter of fastening the extra wire 2' to the extra fastener 8' disposed at a distance from the surface 6, measuring the inclination of the extra wire 2' with the extra inclinometer 10' and pivoting the mobile member 20 so as to position the extra wire 2' in the plane 4 according to the inclination measured by the extra inclinometer 10'. The pivoting (or rotation) of the mobile member 20 occurs around the axis of the wire 2. This pivoting involves the translation of the mobile member 20 at the level where the extra wire 2' is found. It is this translation that allows positioning the extra wire 2' in the plane 4. It is possible to proceed by positioning one of the wires before the positioning of the other one (translation then rotation of the mobile member 20), or yet by positioning the two wires simultaneously (translation and rotation of the mobile member 20).

The measurement and displacement operations may be performed in a continuous manner or by iteration, until the wire or wires 2, 2' have the desired inclination and are in the intended plane 4. The displacement of the mobile member 20 may be performed by digital determination of the translation and the rotation according to the measurements provided by the inclinometer or inclinometers 10, 10'.

Since the device is compact, it is possible to align multiple wires 2, 2' close to one another if desired. The device also allows that the wires 2, 2' be taut to much higher tension levels than those possible with a pendulum, for example 200 pounds compared to from 30 to 40 pounds for a pendulum. The high tension in the wires and the absence of weight or floater sensitive to the perturbations of the environment render the measurements of the inclinometers 10, 10' precise. The device may have a precision in the order of 1/10 000e of degree in the positioning of the wire or wires 2, 2'.

While embodiments of the invention have been illustrated in the accompanying drawings and described above, it will be evident to those skilled in the art that modifications may be made therein without departing from the invention. For example, although the device is particularly useful for aligning wires 2, 2' at the vertical or the horizontal, it may be adapted to align wires in other inclined planes if desired, by changing the positioning of the counterweight 24 (shown in FIGS. 2 and 3) or the shape of the parts to compensate their effect on the wires 2, 2' at the chosen inclination (or angle).

The invention claimed is:

1. A device for aligning at least one wire in a plane projecting from a surface on which an end of the wire is anchored, comprising:
   a fastener disposed at a distance from the surface to hold the wire in taut position;
   an inclinometer rigidly connected to the fastener, the inclinometer being capable of measuring an inclination of the wire held by the fastener;
   a joint having first and second elements articulated with respect to each other in order to allow a relative angular displacement of the elements, the first articulated element being rigidly connected to the inclinometer; and
   a structure having a mobile member to which the second articulated element is secured, the mobile member being movable with respect to the surface in order to allow a positioning of the wire in the plane according to the inclination of the wire measured by the inclinometer.

2. The device according to claim 1, wherein the fastener, the inclinometer and the joint extend in a same axis.

3. The device according to claim 1, further comprising a counterweight coupled to the first articulated element and projecting between the mobile member and the inclinometer.

4. The device according to claim 3, wherein the first and second articulated elements comprise respective forks coupled to each other by an intermediate element with two rotation axes.

5. The device according to claim 4, wherein the counterweight and the inclinometer have symmetrical positions with respect to the intermediate element.

6. The device according to claim 1, wherein the plane extends horizontally.

7. The device according to claim 1, wherein the plane extends vertically.

8. The device according to claim 1, wherein the structure comprises a table having at least two degrees of liberty in translation and one degree of liberty in rotation.

9. The device according to claim 1, wherein:
   the at least one wire comprises at least one extra wire having an end anchored on the surface at an anchoring point located at a distance from an anchoring point of the other wire;
the device further comprising:
   an extra fastener disposed at a distance from the surface for holding the extra wire in taut position;
   an extra inclinometer rigidly connected to the extra fastener, the extra inclinometer being capable of measuring an inclination of the extra wire held by the extra fastener; and
   an extra joint having first and second elements articulated with respect to each other in order to allow a relative angular displacement of the elements, the first articulated element of the extra joint being rigidly connected to the extra inclinometer;
   the second articulated element of the extra joint being secured to the mobile member at a distance from the second articulated element of the other joint, the mobile member being pivotable at least with respect to an axis in which the other wire is taut in order to allow a positioning of the extra wire in the plane according to the inclination measured by the extra inclinometer.

10. The device according to claim 9, further comprising a plate having a surface, the ends of the wires being anchored on the surface of the plate.

11. The device according to claim 9, wherein the distances between the anchoring points of the wires and between the second articulated elements are substantially identical so that the wires extend in parallel when the wires are taut.

12. A method for aligning at least one wire in a plane projecting from a surface on which an end of the wire is anchored, comprising the steps of:
   fastening the wire to a fastener disposed at a distance from the surface for holding the wire in taut position;
   measuring an inclination of the wire held by the fastener with an inclinometer rigidly connected to the fastener;
   providing a joint having first and second elements articulated with respect to each other in order to allow a relative angular displacement of the elements, the first articulated element being rigidly connected to the inclinometer;
   providing a structure having a mobile member to which the second articulated element is secured; and
   moving the mobile member with respect to the surface in order to position the wire in the plane according to the inclination of the wire measured by the inclinometer.

13. The method according to claim 12, further comprising the step of compensating an effect of the inclinometer on the wire with a counterweight coupled to the first articulated element and projecting between the mobile member and the inclinometer.

14. The method according to claim 12, wherein the plane extends horizontally.

15. The method according to claim 12, wherein the plane extends vertically.

16. The method according to claim 12, wherein the at least one wire comprises at least one extra wire having an end anchored on the surface at an anchoring point located at a distance from the anchoring point of the other wire;
the method further comprising the steps of:
   fastening the extra wire to an extra fastener disposed at a distance from the surface to hold the extra wire in taut position;
   measuring an inclination of the extra wire held by the extra fastener with an extra inclinometer rigidly connected to the extra fastener;
   providing an extra joint having first and second elements articulated with respect to each other in order to allow a relative angular displacement of the elements, the first articulated element of the extra joint being rigidly connected to the extra inclinometer;
   securing the second articulated element of the extra joint to the mobile member at a distance from the second articulated element of the other joint; and
   pivoting the mobile member at least with respect to an axis in which the other wire is taut in order to position the extra wire in the plane according to the inclination measured by the extra inclinometer.

17. The method according to claim 16, wherein the distances between the anchoring points of the wires and between the second articulated elements are substantially identical so that the wires extend in parallel when the wires are taut.

* * * * *